United States Patent
Sesham et al.

(10) Patent No.: US 10,979,513 B2
(45) Date of Patent: Apr. 13, 2021

(54) DYNAMIC SERVICE DISCOVERY AND CONTROL OF LOAD DISTRIBUTION

(71) Applicant: Verizon Patent and Licensing Inc., Arlington, VA (US)

(72) Inventors: Lalith Kumar Sesham, Bangalore (IN); Rajesh Kalshetty, Bangalore (IN); Srinivasan Krishnamoorthy, Bangalore (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 143 days.

(21) Appl. No.: 15/883,351

(22) Filed: Jan. 30, 2018

(65) Prior Publication Data

US 2019/0238642 A1  Aug. 1, 2019

(51) Int. Cl.
  *H04L 29/08*  (2006.01)
  *H04L 12/26*  (2006.01)
  *H04L 29/12*  (2006.01)

(52) U.S. Cl.
  CPC .......... *H04L 67/16* (2013.01); *H04L 43/0805* (2013.01); *H04L 43/0811* (2013.01); *H04L 43/10* (2013.01); *H04L 61/1511* (2013.01); *H04L 67/1036* (2013.01)

(58) Field of Classification Search
None
See application file for complete search history.

(56) References Cited

U.S. PATENT DOCUMENTS

| | | | |
|---|---|---|---|
| 8,522,086 B1* | 8/2013 | Garrett | G06F 11/3006 714/48 |
| 2016/0241659 A1* | 8/2016 | Wessendorf | H04L 67/26 |
| 2016/0366233 A1* | 12/2016 | Le | H04L 41/0866 |
| 2018/0309634 A1* | 10/2018 | Makovsky | H04L 41/12 |
| 2019/0007366 A1* | 1/2019 | Voegele | H04L 12/4633 |
| 2019/0149618 A1* | 5/2019 | Tsai | H04L 67/02 709/202 |
| 2019/0227781 A1* | 7/2019 | Ramasamy | H04L 41/0813 |

OTHER PUBLICATIONS

Kleinman, Eli. 'Using Consul for Service Discovery in Multiple Data Centers—Part 1', Eli's Blog, Aug. 31, 2017 [retrieved on Jun. 22, 2019]. Retrieved from the Internet: <URL: https://www.devtech101.com/2017/08/31/using-consul-service-discovery-multiple-data-centers-part-1/>. (Year: 2017).*

(Continued)

*Primary Examiner* — Sm A Rahman
*Assistant Examiner* — Dae Kim

(57) ABSTRACT

A method may include identifying a service discovery manager associated with a first data center and registering with the service discovery manager. The method may also include, transmitting, by the service discovery manager, information identifying first services that are available at the first data center and information identifying a second data center in which one or more of the first services are available. The method may further include receiving the information identifying the first services that are available and the information identifying the second data center and updating a database based on the information identifying the first services that are available.

20 Claims, 8 Drawing Sheets

(56) References Cited

OTHER PUBLICATIONS

Kleinman. "Using Consul for Service Discovery in Multiple Data Centers—Part 2", Devtech101.com, Aug. 31, 2017 [retrieved on Dec. 23, 2013]. Retrieved from the Internet: <URL: https://www.devtech101.com/2017/08/31/using-consul-service-discovery-multiple-data-centers-part-2>. (Year: 2017).*

"DNS Interface", Consul Documentation, consul.io website, Jul. 5, 2017 [retrieved on Dec. 23, 2019]. Retrieved from the Internet: <URL: https://web.archive.org/web/20170705203055/https://www.consul.io/docs/agent/dns.html>. (Year: 2017).*

"Tracking Your Infrastructure Health with Consul", MyOpsBlog.com, Dec. 14, 2016 [retrieved on Aug. 11, 2020]. Retrieved from the Internet: <URL: https://myopsblog.wordpress.com/2016/12/14/tracking-your-infrastructure-health-with-consul/>. (Year: 2016).*

\* cited by examiner

DYNAMIC SERVICE DISCOVERY AND CONTROL OF LOAD DISTRIBUTION

BACKGROUND INFORMATION

In a cloud-based service architecture, discovering the location of a service is important part of providing for delivery of the particular service. For example, cloud-based micro services typically get assigned network locations that are accessible to users. However, network locations for the particular services can change based on service restarts, data center failures, load-balancing, etc. A user may therefore be forced to use a different service address than the one originally used for a particular service. Changing service addresses for a service often causes problems associated with providing access to the service.

For example, when a service address changes or a new service address is added, the service provider typically needs to register the new service address and de-register the old service address at a central service registry or domain name system (DNS). DNS entries, however, typically have time to live (TTL) values and if a service goes down, it may take up to the TTL time or longer before service can be redirected to another instance or location of that service. In addition, for every service request, a user/client typically queries a DNS server, which increases the load on the DNS server and often slows down responses to DNS queries. As a result, accessing a service with a changed service address is typically a time consuming process.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to systems and methods that enable users to access services from a service provider, data center, etc. In one exemplary implementation, a client device communicates with a control or manager device located at a data center to obtain service information identifying the location of various services, as well as an alternative location for the services. The manager device may also monitor the availability of services and communicate a service address change for a particular service to the client device in real time or near real time. For example, the manager device may identify a change in the service address associated with a particular service based on policies, load-balancing, failures, etc., to enable end users to access the desired service in an efficient manner. In one exemplary implementation, the service address change is communicated to the client device, which may then change the current or active address for the service in a local database. End users may then query the local database and obtain the current service address that provides the service. As a result, users are able to access the desired service without any delays. In addition, implementations described herein provide for geographical redundancy or backup that allows users to receive services from different data centers or locations when a problem occurs in a particular data center for a particular service, or a problem occurs to the data center itself. This geographical redundancy enables users to seamlessly receive services without delay, even when problems occur.

Figure 1:
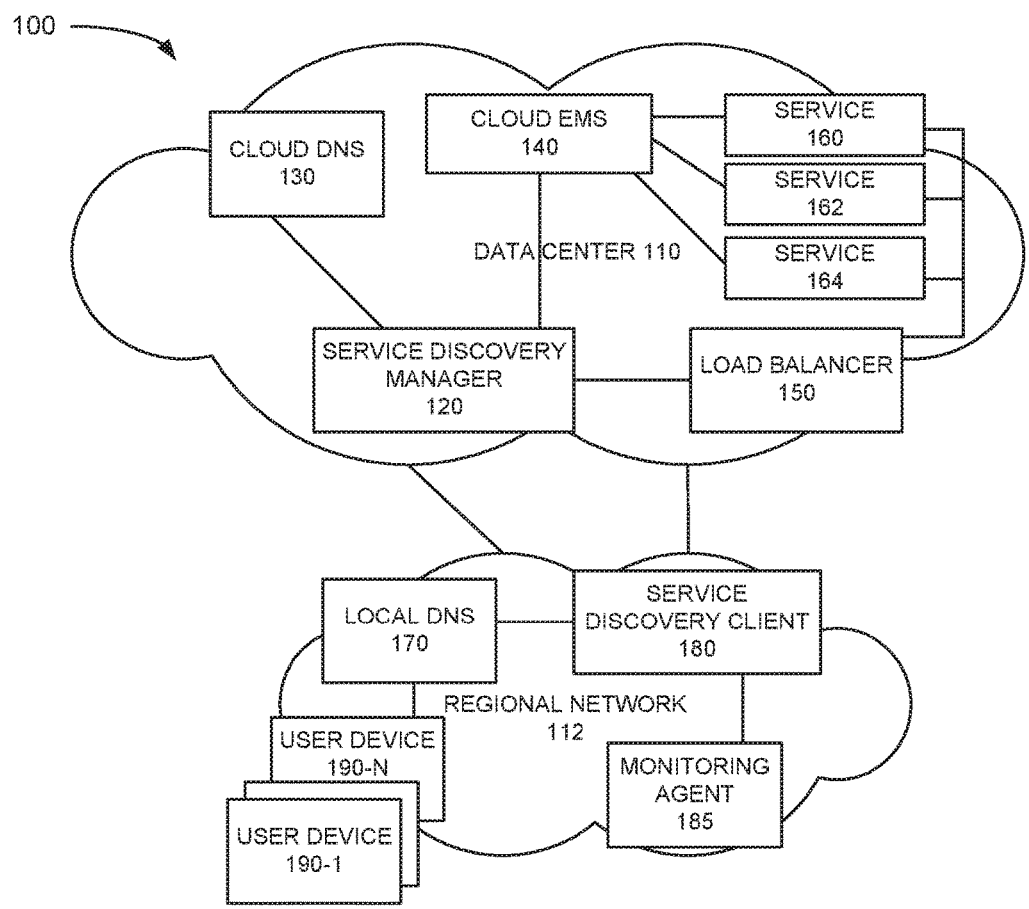
FIG. 1 illustrates an exemplary environment in which systems and methods described herein may be implemented.

FIG. 1 is a block diagram of an exemplary environment 100 in which systems and methods described herein may be implemented. Referring to FIG. 1, environment 100 includes data center 110 and regional network 112. Data center 110 may represent a data center managed by a service provider to provide various services to customers/clients. Data center 110 includes service discovery manager (SDM) 120, cloud domain name system (DNS) 130, cloud emergency management system (EMS) 140, load balancer 150, service 160, service 162 and service 164. Regional network 112 may represent a local network which includes infrastructure components to facilitate the accessing of services from data center 110 by user devices 190-1 through 190-N. Regional network 112 include local DNS 170, service discovery client (SDC) 180, monitoring agent 185 and user devices 190-1 through 190-N. The exemplary configuration illustrated of components in data center 110 and regional network 112 in FIG. 1 is provided for simplicity. It should be understood that a typical data center and a typical regional center may include more or fewer devices than illustrated in FIG. 1.

Service discovery manager (SDM) 120 may include one or more computing devices, servers, etc., that manage the provisioning of new services and the modifying of existing services in data center 110. For example, SDM 120 may communicate with client devices to allocate or assign primary and secondary data centers to a number of regional networks, including regional network 112. SDM 120 may also communicate with other components of data center 110, such as cloud EMS 140 and load balancer 150 to monitor service availability in data center 110 and ensure that any changes in data center 110 are communicated to client devices (e.g., SDC 180), and users/customers (e.g., user devices 190), in real time or near real time. SDM 120 may also allow for switchover between data centers after verifying the availability of services in another data center when a data center failure or problem occurs.

Cloud DNS 130 may include one or more computing device, servers, etc., that stores domain name information and address information associated with various services associated with data center 110. For example, cloud DNS 130 may store information identifying Internet protocol (IP) addresses associated with each of services 160, 162 and 164. SDM 120 may communicate with cloud DNS 130 to pull service IP addresses for particular services and provide those IP addresses to components of regional network 112.

Cloud EMS 140 may include one or more computing devices, servers, etc., that monitors the health of data center 110. For example, cloud EMS 140 may transmit ping messages at predetermined times to each of services 160, 162 and 164. If any of the services 160, 162 and 164 does not respond to one or more of the ping messages in a predetermined amount of time, cloud EMS 140 may determine that the particular service is temporarily down/out-of-service, offline, or experiencing some type of problem. Cloud EMS 140 may also receive alarm information, load information, statistical information, etc., from services 160, 162 and 164 to determine the health/availability of each of services 160, 162 and 164. Cloud EMS 140 may communicate the health information to SDM 120.

Load balancer 150 may include one or more computing device, servers, etc., that balances the load associated within data center 110 and services within data center 110. For example, load balancer 150 may store policy information identifying particular loads, the number of user devices that can access a particular service, such as one of services 160, 162 and 164, or other types of policy information. Load balancer 150 may communicate this information to SDM 120, which may make a decision to offload some of the load on a particular service to an instance of the same service at another data center based on, for example, the policy information.

Services 160, 162 and 164 may each represent services provided to end users. For example, services 160, 162 and 164 may include applications that enable end users to download content, such as music, multi-media files, etc. Services 160, 162 and 164 may also include websites or other applications that provide information of interest, interactive games, various services associated with a service provider, etc., to end users/consumers.

Local DNS 170 may include one or more databases that store domain name information and address information (e.g., IP address) associated with various services, such as services 160, 162 and 164. User devices 190 may access local DNS 170 to identify an IP address associated with a particular domain or service when attempting to access services 160, 162 and 164. In an exemplary implementation, local DNS 170 may synchronize its entries with cloud DNS 130 at predetermined intervals.

Service discovery client (SDC) 180 may include one or more computing devices, servers, etc., that "discovers" or identifies available services in environment 100. For example, SDC 180 may be configured to identify a data center located geographically closest to regional network 112, such as data center 110. SDC 180 may then communicate with data center 110 to obtain service address information for particular services, as well as address information associated with the services at an alternative data center. For example, SDC 180 may provide IP information for services associated with data center 110 to local DNS 170 and update the IP address information based on, for example, data connectivity problems with respect to a particular data center, such as data center 110. SDC 180 may also interact with SDM 120 to monitor network connectivity with both the primary and alternative data center, as well as monitor statistical thresholds or alarm triggers associated with a data center, and initiate a switchover to the alternative data center, if necessary, based on the monitoring.

Monitoring agent 185 may include one or more computing devices, server, etc., that identify the health of various services. For example, monitoring agent 185 may receive event information, statistics and alarms associated with access to services in data center 110. Monitoring agent 185 may use this information to determine the health (e.g., operating properly, offline/failure, etc.) of various services in data center 110 and communicate this information to SDC 180.

User devices 190-1 through 190-N (referred to individually as user device 190 or 190-x, and collectively as user devices 190) may represent end users or devices that access one or more of services 160, 162 and 164 to obtain information of interest, interact with the particular service/application, download information, etc. For example, user devices 190 may query local DNS 170 when attempting to access one of services 160, 162 and 164 to obtain the IP address of the desired service.

User devices 190 may each include a mobile device, such as a wireless or cellular telephone device (e.g., a conventional cell phone with data processing capabilities), a smart phone, a personal digital assistant that includes a radiotelephone, etc. User devices 190 may also include any type of computer device or system, such as a personal computer (PC), a laptop, a tablet computer, a notebook, a netbook, a wearable computer (e.g., a wrist watch, eyeglasses, etc.), a printer, an email server, a game playing device, a music playing device, a television, a home appliance, a home monitoring device, a camera, etc. User devices 190 may further include Internet of Things (IoT) device or "smart" devices, such as sensors, actuators, home automation devices, etc., that may include communication functionality. For example, IoT devices may include machine type communication (MTC) devices that communicate wirelessly with other devices over a machine-to-machine (M2M) interface.

User devices 190 may also be part of a local area network (LAN) or wide area network (WAN). User devices 190 may connect to regional network 112 and other devices in environment 100 via any conventional technique, such as wired, wireless, optical connections, or a combination of these techniques. User device 190 and the person associated with user device 190 (e.g., the person holding or operating user device 190, the owner of user device 190, etc.) may be referred to collectively as user device 190 in the description below.

As described above, the exemplary configuration illustrated in FIG. 1 is provided for simplicity. It should be understood that a typical environment 100 may include more or fewer devices than illustrated in FIG. 1. For example, it should be understood that environment 100 may include a large number of routing devices, gateways, etc., that aid in providing services to users/consumers in environment 100. It should also be understood that environment 100 may include or support a large number (e.g., hundreds or thousands) of user devices 190, as well as a large number (e.g., dozens or hundreds) of services.

It should also be understood that environment 100 may include one or more wired, wireless and/or optical networks (not shown) that interconnect the components illustrated in FIG. 1 and enable the components in FIG. 1 to communicate with one another. For example, environment 100 may include one or more public switched telephone networks (PSTNs) or other type of switched network. Environment 100 may also include one or more wireless networks and may include a number of transmission towers for receiving wireless signals and forwarding the wireless signals toward the intended destinations. Environment 100 may further include one or more satellite networks, one or more packet switched networks, such as an Internet protocol (IP) based network, a local area network (LAN), a wide area network (WAN), an intranet, the Internet, or another type of network that is capable of transmitting data from a source device to a destination device.

Further, various functions are described below as being performed by particular components in environment 100. In other implementations, various functions described below as being performed by one device may be performed by another device or multiple devices, and various functions described as being performed by multiple devices may be combined and performed by a single device.

Figure 2:
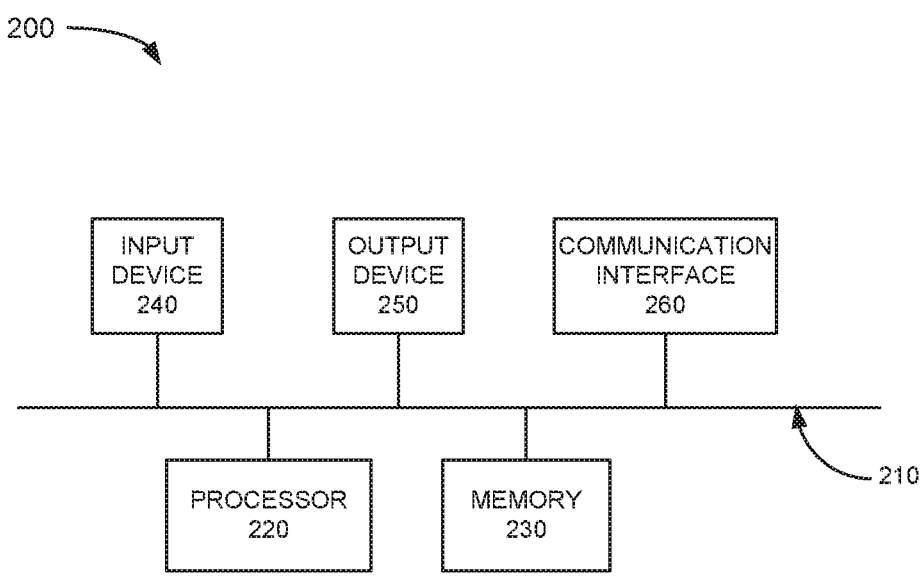
FIG. 2 illustrates an exemplary configuration of components implemented in one or more of the components or devices of FIG. 1.

FIG. 2 illustrates an exemplary configuration of device 200. Device 200 may correspond to one or more devices/components in environment 100, such as SDM 120, cloud DNS 130, cloud EMS 140, load balancer 150, service 160, service 162, service 164, local DNS 170, SDC 180, monitoring agent 185 and user device 190. Other components in environment 100 (not shown in FIG. 1), such as additional components in data center 110 and/or regional network 112 may be configured in a similar manner.

Referring to FIG. 2, device 200 may include bus 210, processor 220, memory 230, input device 240, output device 250 and communication interface 260. Bus 210 may include a path that permits communication among the elements of device 200.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive.

Input device 240 may include a mechanism that permits a user to input information to device 200, such as a keyboard, a keypad, a mouse, a pen, a microphone, a touch screen, voice recognition and/or biometric mechanisms, etc. Output device 250 may include a mechanism that outputs information to the user, including a display, a printer, a speaker, etc. In some implementations, a touch screen display may act as both an input and an output device. In still other implementations, device 200 may be a "headless" device that does not include an input device and/or output device.

Communication interface 260 may include a transceiver for communicating with other devices via wired, wireless or optical mechanisms. Communication interface 260 may also include one or more radio frequency (RF) transmitters, receivers and/or transceivers and one or more antennas for transmitting and receiving RF data via network 100. Communication interface 260 may also include a modem or an Ethernet interface to a LAN or other mechanisms for communicating with elements in environment 100, or another environment.

The exemplary configuration illustrated in FIG. 2 is provided for simplicity. It should be understood that device 200 may include more or fewer devices than illustrated in FIG. 2. In an exemplary implementation, one or more components of device 200 may perform operations in response to processor 220 executing sequences of instructions contained in a non-transitory computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

As described above, data center 110 may provide services to end users/consumers. In an exemplary implementation, another data center may provide geographical redundancy that allows end users/consumers to receive services from a different data center when, for example, a problem occurs, a particular service becomes overloaded, etc., as described in detail below.

Figure 3:
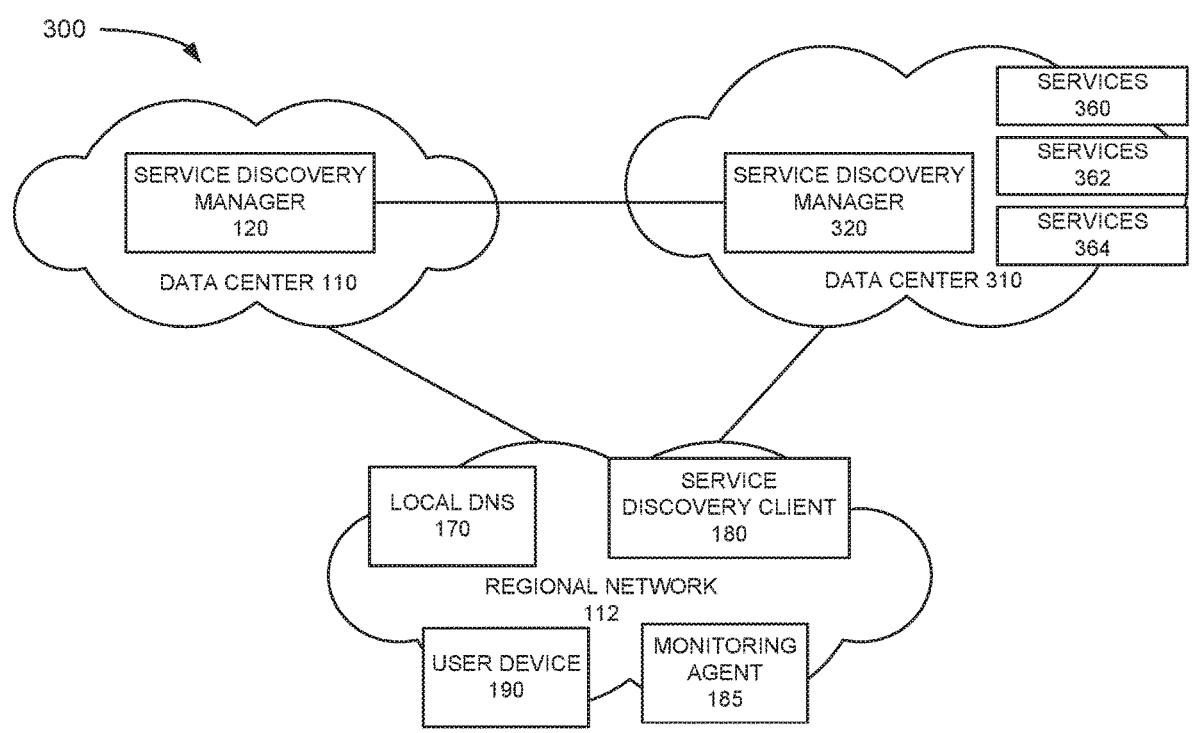
FIG. 3 illustrates another exemplary environment with multiple data centers in which systems and methods described herein may be implemented.

FIG. 3 illustrates an environment 300 that includes data center 110, data center 310 and regional network 112. Data center 310 may represent a data center that is similar to data center 110. Referring to FIG. 3, data center 110 includes service discovery manager (SDM) 320 and services 360, 362 and 364. Data center 310 may also include other components similar to those shown in FIG. 1 for data center 110.

SDM 320 may include one or more computing devices, servers, etc., that perform similar functions in data center 310 as SDM 120 performs in data center 110 described above. Services 360, 362 and 364 may correspond to services 160, 162 and 164 in data center 110. That is, service 360 may provide the same service as service 160, service 362 may provide the same service as service 162 and service 364 may provide the same service as service 364. Providing the same services in different data centers provides for geographical redundancy with respect to the offered services. In this manner, if a problem occurs with respect to a particular service in one of data centers 110 or 310, the service may be available in the other one of the two data centers. In addition, two data centers 110 and 310 are shown in FIG. 3 for simplicity. It should be understood that environment 300 could includes many more data centers than illustrated in FIG. 3.

Figure 4:
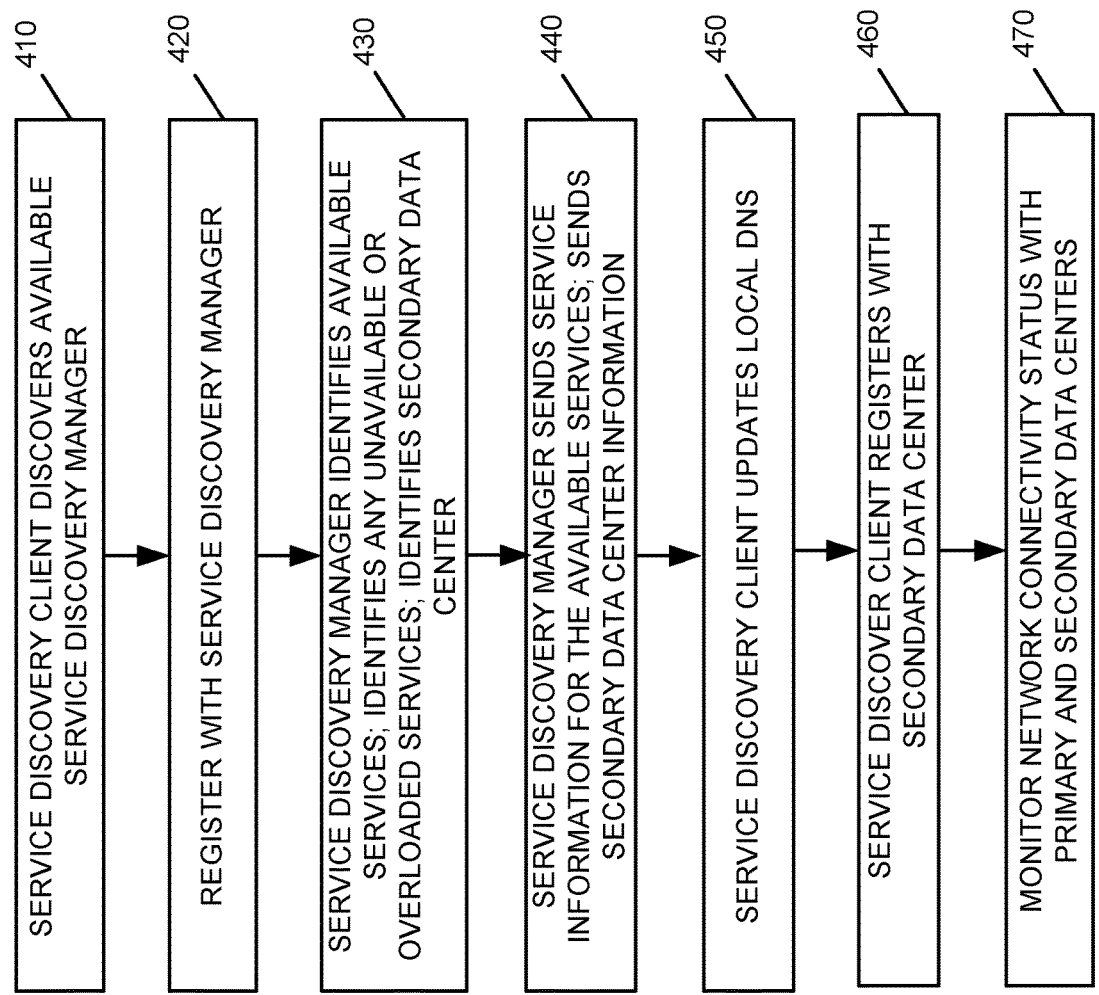
FIG. 4 is a flow diagram illustrating exemplary processing associated with service discovery and registration in the environments of FIGS. 1 and 2.
Figure 5:
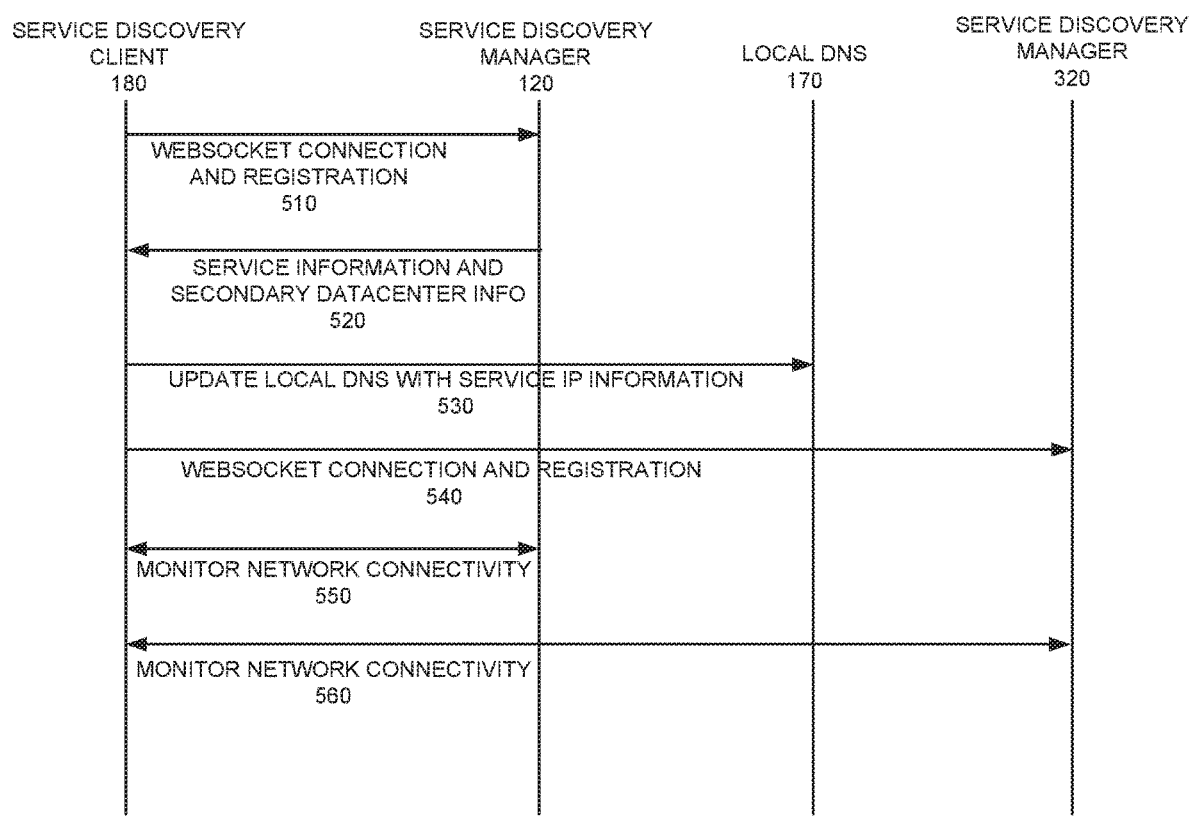
FIG. 5 is a signal flow diagram associated with the processing of FIG. 4.

FIG. 4 is an exemplary flow diagram illustrating processing associated with service discovery and registration and FIG. 5 is an exemplary signal flow diagram associated with the processing in FIG. 4. The processing of FIG. 4 will be described in connection with the signal flow diagram of FIG. 5. Processing may begin upon start up of SDC 180. Upon start up, SDC 180 discovers a service discovery manager available for communications (block 410). For example, SDC 180 may be configured to identify a data center and corresponding service discovery manager located closest to regional network 112. In this example, assume that SDC 180 identifies SDM 120 in data center 110 by performing, for example, a domain name system (DNS) resolution of the fully qualified domain name (FQDN) of the discovered or identified service discovery manager. SDC 180 may discover and/or resolve the FQDN through DNSMasq, SkyDNS, or another application.

After discovering SDM 120, SDC 180 may initiate a websocket connection with SDM 120 and register for services (block 420; FIG. 5, 510). For example, SDC 180 may communicate with SDM 120 to establish a persistent websocket connection. SDC 180 may also transmit a registration message to SDM 120 to register with SDM 120 via the websocket connection. The websocket connection may serve as a persistent connection to exchange information between SDC 180 and SDM 120, as well as serve as a network connectivity monitor between SDC 180 and SDM 120. For example, SDC 180 may communicate with SDM 120 via ping messages, keep alive messages, heart beat messages, or other types of connectivity status messages. If a response to one or more of the ping/keep alive/heart beat messages is not received from SDM 120 within a predetermined period of time after being transmitted, SDC 180 may determine that a failure has occurred and a failover procedure may be initiated, as described in more detail below.

SDM 120 may receive the SDC registration message and identify service information to send to SDC 180 (block 430; FIG. 5, 520). For example, SDM 120 may identify available services at data center 110 and access cloud DNS 130 to identify and provide the Internet protocol (IP) addresses of each of the available services in data center 110, such as the IP address for service 160 and the IP address for service 162.

SDM 120 may also identify one or more services that are not currently available at data center 110 and identify secondary data center information where that particular service can be accessed (block 430). For example, assume that service 164 is not currently available at data center 110. In this situation, SDM 120 may receive information indicating that service 164 is not available via cloud EMS 140 and identify another data center that includes another instance of the same service as service 164. For example, SDM 120 may determine that data center 310 includes service 364 which is the same as service 164. In this case, SDM 120 may identify the IP address of data center 310 as the data center with which to communicate for service 364.

SDM 120 may also identify the IP address of a secondary data center if a particular service at data center 110 is overloaded (block 430). For example, load balancer 150 may load balance traffic associated with particular services based on data center or service provider policy information to ensure that one particular service at a data center does not become overloaded. In this scenario, SDM 120 may receive load balancing information from load balancer 150 indicating that one of services 160, 162 and 164 is overloaded. SDM 120 may then identify the IP address of a secondary data center for the overloaded service in which that particular service is available and not overloaded.

SDM 120 may also identify the IP address of a secondary data center that SDC 180 can reach for services in case of network connectivity failure or in case of a later failure/overload of one or more services at the data center with which SDC 180 is registered (e.g., data center 110 in this example) (block 430). The secondary data center may then be used by end users in case of a failure at data center 110.

SDM 120 transmits the service information for available services, secondary service information for services that are unavailable and secondary data center information in case of a data center problem or failure to SDC 180 (block 440; FIG. 5, 520). SDC 180 receives the service information (e.g., IP addresses) for available services and the service center/IP addresses for services that are not available at data center 110 and the secondary data center information. SDC 180 then updates local DNS 170 with the service IP addresses for the various services that are available in data center 110 (block 450; FIG. 5, 530). In situations in which SDC 180 receives secondary data center information for particular services, such as information for one or more services that are not available in data center 110, but are available in data center 310, SDC 180 also updates local DNS 170 with the IP addresses of data center 310 for those particular services.

Upon receiving the registration response message from SDM 120, which includes the alternative/secondary data center information, SDC 180 may initiate a websocket connection with the secondary data center and register with the secondary data center (block 460). For example, assume that the registration response message identified data center 310 as the alternative data center. In this case, SDC 120 initiates a persistent connection with data center 310 and sends a registration message to SDM 320 in data center 310 (FIG. 5, 540). In response to the registration message, data center 310 may send information identifying available services at data center 310 to SDC 180. For example, SDM 320 may send IP addresses for services 360, 362 and 364 to SDC 180. SDC 180 receives the registration response message and updates local DNS 170 identifying the IP addresses of the available services.

SDC 180 may also monitor the websocket connection with both data center 110 and data center 310 (block 470; FIGS. 5, 550 and 560). For example, SDC 180 may send ping messages to SDM 120 at data center 110 and to SDM 320 at data center 310 at predetermined intervals. If a response is not received from one of the ping messages, SDC 180 may determine that a failure has occurred in the corresponding data center 110 or 310, as described in more detail below.

In the manner described above, regional network 112 may monitor data centers 110 and 310 and become aware of changes in connectivity or status of particular data centers in real time or near real time. In addition, SDMs 120 and 320 may communicate any changes in particular services in real time or near real time to SDC 180, which allows SDC 180 to change service address information for available services in real time or near real time. User devices 190 querying local DNS 170 to obtain an IP address for a particular service may then be directed to the IP address of the service at the appropriate data center without having to wait for any redirection associated with a failed access attempt caused by an unavailable service.

Figure 6:
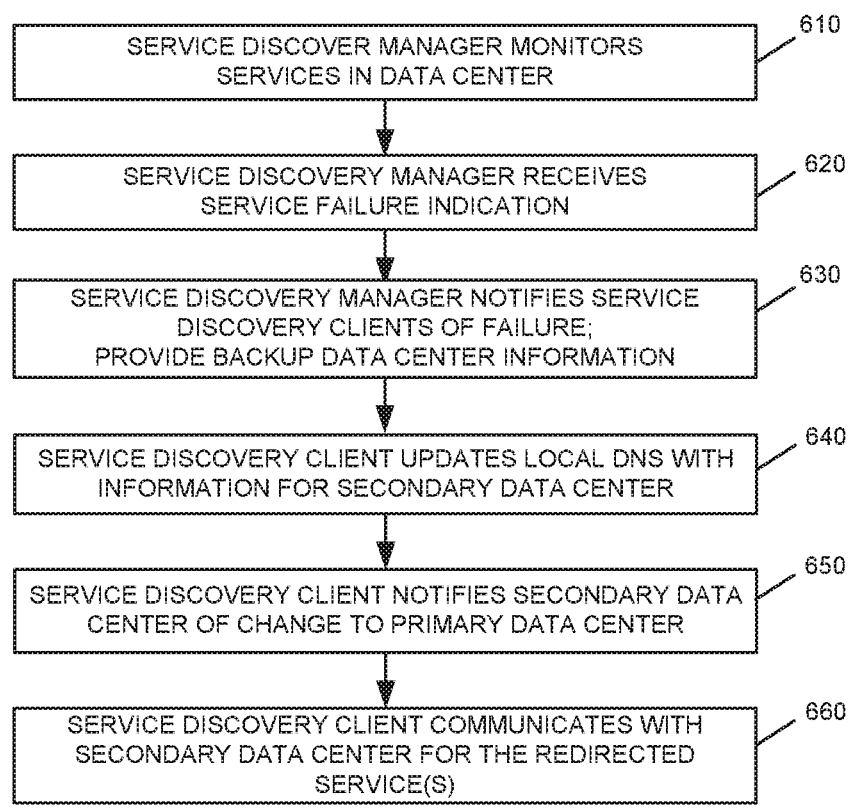
FIG. 6 is a flow diagram illustrating exemplary processing associated with a data center or a service problem in the environments of FIGS. 1 and 2.
Figure 7:
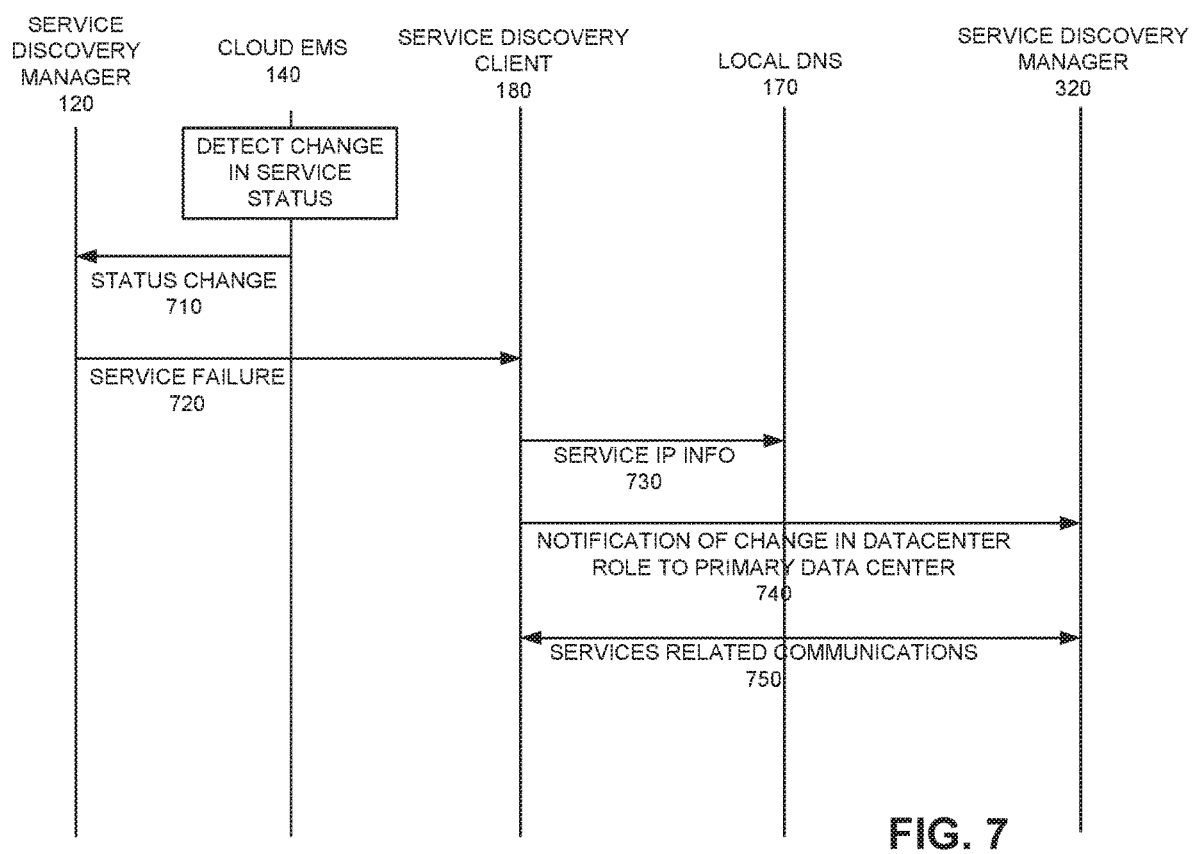
FIG. 7 is a signal flow diagrams associated with the processing of FIG. 6.

FIG. 6 is an exemplary flow diagram illustrating processing associated with data center failover based on status information and FIG. 7 is an exemplary signal flow diagram associated with the processing in FIG. 6. The processing of FIG. 6 will be described in connection with the signal flow diagram of FIG. 7. Processing may begin with each service discovery manager monitoring the status of services running in its local data center (block 610). For example, SDM 120 may interface with cloud EMS 140 to monitor the status of services 160, 162 and 164 associated with data center 110. SDM 320 may interface with a similar cloud EMS device (not shown in FIG. 3) to monitor the status of services 360, 362 and 364.

Assume that cloud EMS 140 detects a failure associated with service 162. For example, cloud EMS 140 may detect the failure based on service 162 not responding to a ping message, based on an alarm from service 162, statistics or thresholds associated with the operation of service 162, such as the time for service 162 to respond to access requests from user devices 190, etc. Upon detecting a failure associated with service 162, cloud EMS 140 forwards the status change message to SDM 120 (block 620, FIG. 7, 710).

SDM 120 then notifies all service discovery clients that are registered with data center 110 as the primary data center 110 of the failure (block 630). For example, SDM 120 may notify SDC 180 of the service failure, as well as notify other SDCs that are registered with data center 110 as the primary data center for that service (FIG. 7, 720). Along with the failure notification, the notification message transmitted by SDM 120 to SDC 180 may include information identifying a backup or secondary data center at which the SDC 180 can receive that particular service (block 630). For example, SDM 120 may indicate that data center 310 includes service 362, which is the same service as service 162 which has become unavailable at data center 110. In an exemplary implementation, upon receipt of the service failure notification, SDC 180 may update the DNSMasq input file with FQDN-IP details from the secondary data center (e.g., data center 310 in this example).

SDC 180 receives the notification and backup data center information and updates local DNS 170 with the service IP information (block 640; FIG. 7, 730). SDC 180 may also notify data center 310 of the status change from being a backup data center for that particular service to being the primary data center for SDC 180 for that particular service (block 650; FIG. 7, 740). The information identifying data center 310 as the primary data center for that particular service may be used by the load balancer at data center 310 (not shown in FIG. 3) to balance the load for that service. SDC 180 may then communicate with SDM 320 for the redirected service(s) services (block 660; FIG. 7, 750). For example, SDC 180 may update local DNS 170 each time a service problem occurs with the IP address for the alternative/backup data center 310. In this manner, user devices 190 querying local DNS 170 for an IP address for a particular service will be directed to the data center where the service is available.

As described above, SDC 180 and SDMs 120 and 320 use ping messages or keep alive messages to monitor network connectivity. Upon failure to receive a response to a ping/keep alive message, SDC 180 initiates a data center failover to the secondary data center, as described in detail below.

Figure 8:
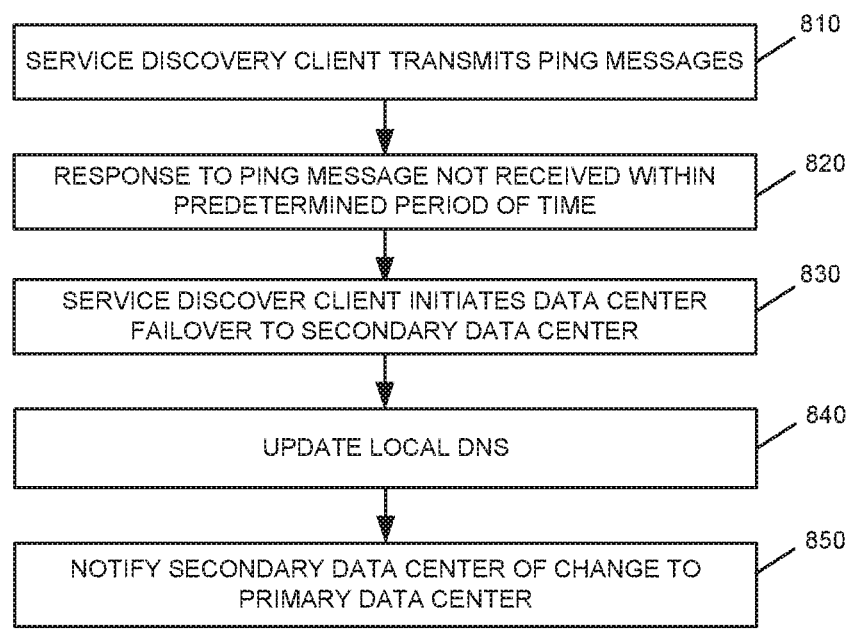
FIG. 8 is a flow diagram illustrating exemplary processing with a data center failover.

FIG. 8 illustrates exemplary processing associated with a data center failover based on connectivity issues. Processing may begin with SDC 180 sending ping messages to data center 110 and data center 310 (block 810). The ping messages may be sent at predetermined intervals, such as every one to two seconds, every 10 seconds, every 60 seconds, etc. SDMs 120 and 320 may receive the messages and if operating properly, transmit a response to the ping messages. In one implementation, SDM 120 may monitor the quality of service in data center 110 through cloud EMS 140. For example, cloud EMS 140 may monitor services 160, 162 and 164 via alarm thresholds, statistics regarding how quickly services 160, 162 and 164 respond to requests from client devices 190, etc.

Assume that SDC 180 does not receive a response to a ping message from SDM 120 within the predetermined period of time (block 820). In this case, there may be a failure in the websocket/persistent connection to data center 110 or some other failure at data center 110. SDC 180 may then initiate a data center failover to the secondary data center, such as data enter 310 (block 830). In this scenario, SDC 180 updates local DNS 170 with IP addresses for services located in data center 310 that will now be used by user devices 190 (block 840). In an exemplary implementation, upon receipt of the data center failure notification, SDC 180 may update the DNSMasq input file with FQDN-IP details from the secondary data center (e.g., data center 310 in this example). SDC 180 also notifies SDM 320 that data center 310 will change its role to primary data center from secondary data center (block 850).

In the event that SDC 180 later detects that the problem or failure in communications to data center 110 is resolved, SDC 180 may initiate a change or switch back to data center 110 acting as the primary data center for services for regional network 112. That is, in one implementation, SDC 180 may continue to send ping messages to the failed data center (e.g., data center 110) and detect when the failure or problem has been resolved. SDC 180 may then initiate a change back to data center 110 acting as the primary data center and data center 310 acting as the backup data center.

Implementations described herein provide systems, methods and an infrastructure that allows users/consumers to access services from one or more locations based on the status of the service in those locations. The status of services located in, for example, various data centers are monitored and when a change in the status of any service or the status of a data center occurs, the change is communicated to a local network that updates the service address for a particular service in real time or near real time. End users or consumers may then obtain the current service address and access the service without having to be re-directed to the service after a failed attempt to access the service. This allows end users/consumers to efficiently receive services without delays, even when problems occur.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to services located in data centers. In other implementations, the services may not be affiliated with any particular data center.

In addition, although not described above in detail, data centers 110 and 310 may communicate with each other to synchronize the service status information to allow each data center to be aware of the status of services in the other data center. For example, SDM 120 and SDM 320 may communicate with each at regular intervals to determine the status of services in the other data center. In this manner, when a problem occurs for example, to a service in data center 110, SDM 120 will be aware of the status of the same service in data center 310 before providing alternative data center information associated with one or more services to SDC 180. Similarly, SDM 120 will be aware of the overall status of data center 310 before providing information identifying data center 310 as an alternative or backup data center in the event of a problem at data center 110.

Further, while series of acts have been described with respect to FIGS. 4, 6 and 8 and series of signal flows have been described with respect to FIGS. 5 and 7, the order of the acts and/or signal flows may be varied in other implementations. Moreover, non-dependent acts or signal flows may be implemented in parallel.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessors, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method, comprising:
   identifying, by a service discovery device, a service discovery manager associated with a first data center;
   registering, by the service discovery device, with the service discovery manager;
   transmitting, by the service discovery manager to the service discovery device and in response to the registering, information identifying first services that are available at the first data center and information identifying a second data center in which one or more of the first services are available;
   receiving, by the service discovery device, the information identifying the first services that are available at the first data center and the information identifying the second data center as an alternate data center;
   sending, by the service discovery device and in response to receiving the information identifying the second data center as an alternate data center, a registration message to the second data center;
   receiving, at the service discovery device and from the second data center in response to sending the registration message, information identifying the one or more of the first services that are available at the second data center;
   updating, by the service discovery device, a database based on the information identifying the first services that are available at the first data center and the one or more of the first services that are available at the second data center;
   receiving, at the service discovery manager and from an emergency management device associated with the first data center, an indication that a second service is not available at the first data center;
   identifying, by the service discovery manager, that an instance of the second service is available at the second data center; and
   providing, to the service discovery device, second information identifying the second data center where the second service is available.

2. The computer-implemented method of claim 1, wherein the database comprises a domain name system (DNS) database and the information identifying the first services comprises Internet protocol (IP) addresses, the method further comprising:
   receiving, by the DNS database and from a user device, a query associated with accessing one of the first services; and
   providing, by the DNS database and to the user device, information identifying an IP address associated with the one of the first services.

3. The computer-implemented method of claim 1, further comprising:
   establishing a persistent connection between the service discovery device and the service discovery manager; and
   monitoring the persistent connection to determine whether a problem exists.

4. The computer-implemented method of claim 3, wherein the monitoring comprises:
   sending messages via the persistent connection at predetermined times,
   monitoring responses to the messages, and
   determining that a problem exists when a response to one of the messages is not received within a predetermined period of time.

5. The computer-implemented method of claim 1, further comprising:
   detecting a network or communication failure between the service discovery device and the first data center; and
   transmitting, by the service discovery device, a notification to the second data center indicating that the second data center is a primary data center with respect to the service discovery device and services previously provided via the first data center.

6. The computer-implemented method of claim 5, further comprising:
   using, by a load balancer at the second data center, the notification to balance a load associated with services provided by the second data center.

7. The computer-implemented method of claim 1, further comprising:
   determining a load on each of the first services in the first data center;
   identifying one of the first services that is overloaded;
   transmitting, by the service discovery manager and to the service discovery device, information identifying an alternative location to obtain the one of the first services;
   receiving, by the service discovery device, the information identifying the alternative location; and
   updating the database based on the received information.

8. The computer-implemented method of claim 1, further comprising:
   initiating, by the service discovery device and in response to receiving the information identifying the second data center, a persistent connection with the second data center.

9. The computer-implemented method of claim 1, wherein the first services comprise a service or application to obtain content or information of interest.

10. A system, comprising:
    a memory; and
    at least one device configured to:
    identify a service discovery manager associated with a first data center,
    register with the service discovery manager, receive, from the service discovery manager and in response to the registering, information identifying first services that are available at the first data center and information identifying a second data center in which one or more of the first services are available, send, in response to receiving the information identifying the second data center as an alternate data center, a registration message to the second data center;

receive, from the second data center, information identifying the one or more of the first services that are available at the second data center;

update a database based on the information identifying the first services that are available at the first data center and the one or more of the first services that are available at the second data center, receive, from the service discovery manager, information identifying a second service that is not available at the first data center, wherein the information identifying the second service was received at the service discovery manager from an emergency management device associated with the first data center, and wherein the service discovery manager determines that an instance of the second service is available at the second data center, and receive, from the service discovery manager and in response to determining that the instance of the second service is available at the second data center, second information identifying the second data center where the second service is available.

11. The system of claim 10, further comprising:
the database, wherein the database comprises a domain name system (DNS) database and the information identifying the first services comprises Internet protocol (IP) addresses, wherein the DNS database is configured to:
receive, from a user device, a query associated with accessing one of the first services, and
provide, to the user device, information identifying an IP address associated with the one of the first services.

12. The system of claim 10, wherein the at least one device is further configured to:
establish a persistent connection with the service discovery manager,
monitor the persistent connection to determine whether a problem exists, and
initiate a switch to the second data center as a primary data center in response to determining that a problem exists.

13. The system of claim 10, wherein the at least one device is further configured to:
initiate, in response to receiving the information identifying the second data center, a persistent connection with the second data center.

14. The system of claim 10, further comprising:
the service discovery manager,
wherein the service discovery manager is configured to:
identify a problem with one of the first services, and
transmit a notification to the at least one device in response to identifying the problem.

15. The system of claim 14, wherein the at least one device is further configured to:
update the database with an address for the one of the first services located in the second data center.

16. The system of claim 14, wherein the service discovery manager is further configured to:

receive information indicating that one of the first services is overloaded, and
transmit, to the at least one device, information identifying an alternative location to obtain the one of the first services, and
wherein the at least one device is further configured to:
receive the information identifying the alternative location, and
update the database based on the received information.

17. A non-transitory computer-readable medium having stored thereon sequences of instructions which, when executed by at least one processor, cause the at least one processor to:
identify a service discovery manager associated with a first data center;
register with the service discovery manager;
receive, from the service discovery manager and in response to the registering, information identifying first services that are available at the first data center and information identifying a second data center in which one or more of the first services are available;
send, in response to receiving the information identifying the second data center as an alternate data center, a registration message to the second data center;
receive, from the second data center, information identifying the one or more of the first services that are available at the second data center;
update a database based on the information identifying the first services that are available at the first data center and the one or more of the first services that are available at the second data center;
receive, from the service discovery manager, information identifying a second service that is not available at the first data center, wherein the information identifying the second service was received at the service discovery manager from an emergency management device associated with the first data center, and wherein the service discovery manager determines that an instance of the second service is available at the second data center; and
receive, from the service discovery manager and in response to determining that the instance of the second service is available at the second data center, second information identifying the second data center where the second service is available.

18. The non-transitory computer-readable medium of claim 17, further including instructions to cause the at least one processor to:
initiate, in response to receiving the information identifying the second data center, a persistent connection with the second data center.

19. The non-transitory computer-readable medium of claim 17, further including instructions to cause the at least one processor to:
update the database with the second information.

20. The non-transitory computer-readable medium of claim 17, further including instructions for causing the at least one processor to:
detect a network or communication failure with the first data center; and
transmit a notification to the second data center indicating that the second data center is a primary data center with respect to services previously provided via the first data center.

* * * * *